United States Patent [19]

Titus

[11] 4,311,074

[45] Jan. 19, 1982

[54] BAND SAW BLADE TIGHTENING DEVICE

[75] Inventor: Timothy C. Titus, Three Rivers, Mich.

[73] Assignee: Wells Manufacturing Corporation, Three Rivers, Mich.

[21] Appl. No.: 109,254

[22] Filed: Jan. 3, 1980

[51] Int. Cl.³ .................. B26D 1/48; B27B 13/08
[52] U.S. Cl. ......................................... 83/816
[58] Field of Search .................. 83/816; 51/148; 474/112, 136

[56] References Cited

U.S. PATENT DOCUMENTS

| | | | |
|---|---|---|---|
| 1,571,972 | 2/1926 | Schettler | 83/816 |
| 2,539,522 | 1/1951 | Pocock | 474/136 |
| 2,740,238 | 4/1956 | Sharpless | 51/148 |
| 2,804,726 | 9/1957 | Johnson | 51/148 |
| 3,680,421 | 8/1972 | Conner et al. | 83/816 |

Primary Examiner—James M. Meister
Assistant Examiner—K. Bradford Adolphson
Attorney, Agent, or Firm—Dressler, Goldsmith, Shore, Sutker & Milnamow, Ltd.

[57] ABSTRACT

A blade tensioning mechanism for a band saw is provided with a block slidably mounted on the saw frame and carrying a movable, non-driven, i.e., idler, band saw blade wheel. A link extends through a cam follower secured to the block and carries a pivotally mounted cam for engaging the cam follower. The end of the link opposite the cam is threaded and is engaged in a threaded bore of a rotatable shaft which is carried on the frame and which is restrained against displacement relative to the frame. A handle is connected to the shaft through a preset torque limiting device whereby the blade can be pretensioned to a predetermined amount by turning the handle to move the link, cam follower, block, and idler wheel relative to the frame. The cam can be subsequently pivoted against the cam follower to further move the idler wheel a predetermined amount to apply a final, operational tension.

10 Claims, 4 Drawing Figures

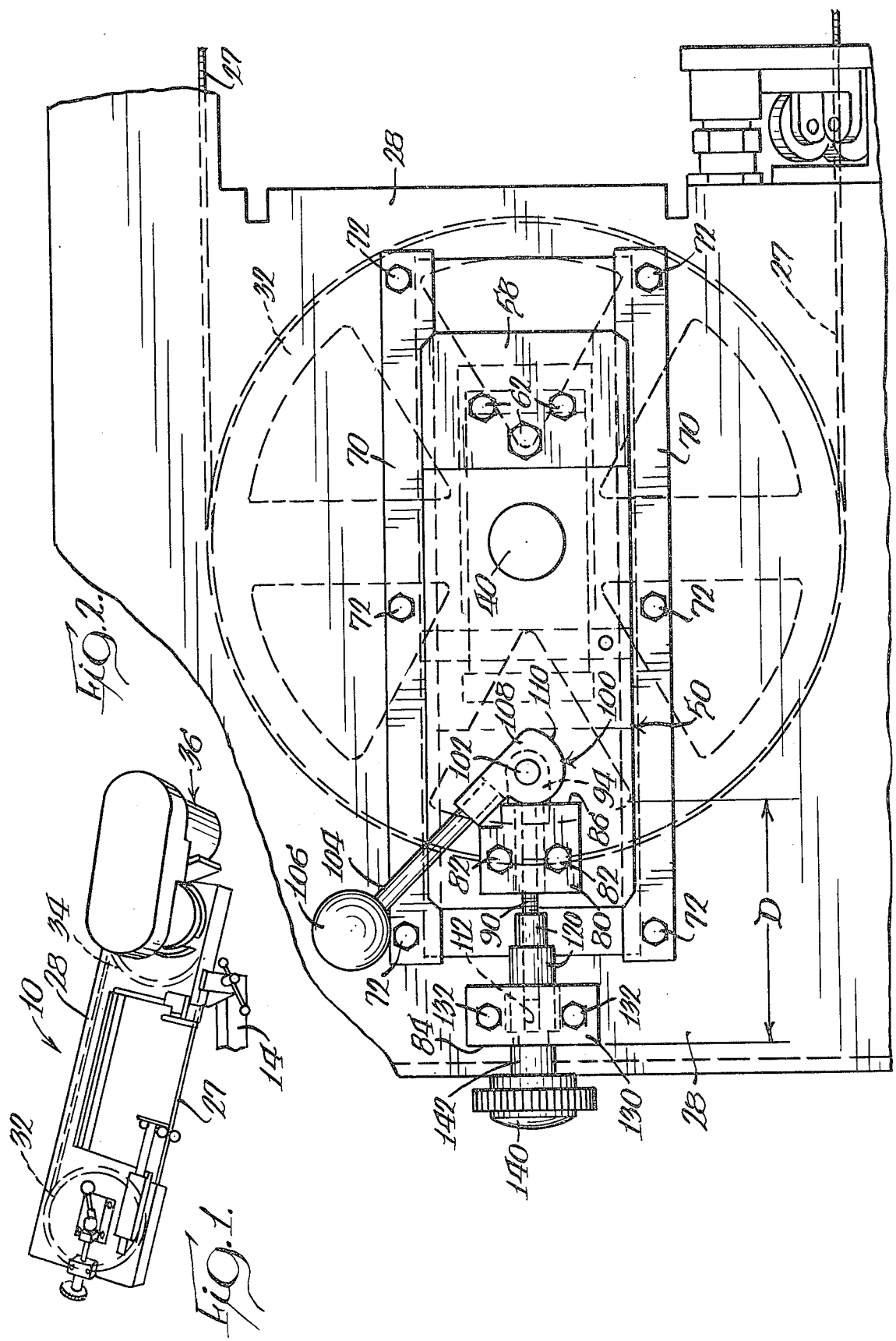

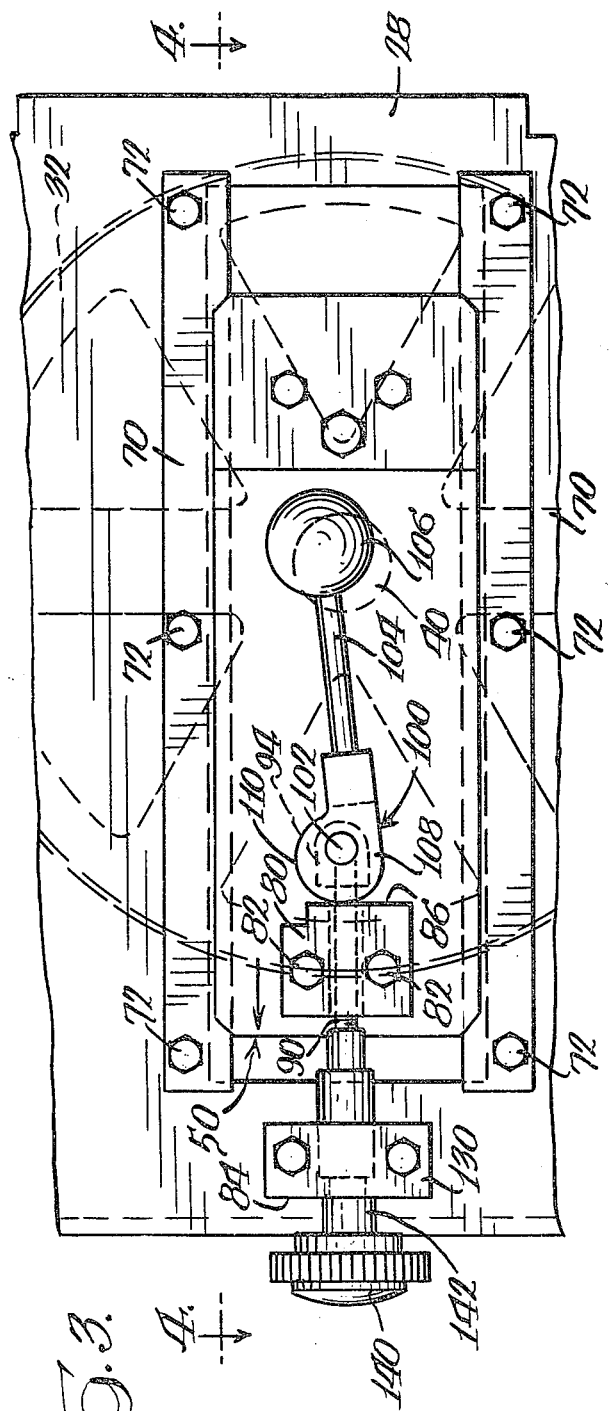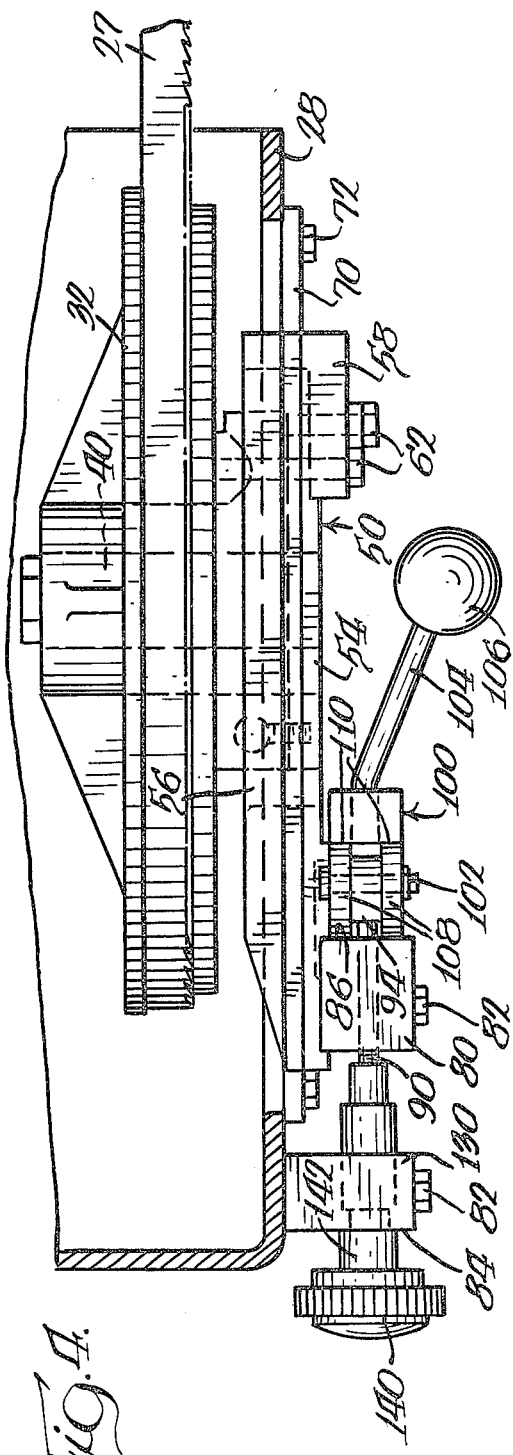

BAND SAW BLADE TIGHTENING DEVICE

DESCRIPTION

1. Technical Field

This invention relates to band saws and to an improvement for tensioning the band saw blade.

2. Background of the Invention

A characteristic feature of a band saw is the continuous loop saw blade which is typically carried on spaced-apart pulleys or band wheels. The band wheels are mounted to a frame for rotation and one of the wheels is rotatably driven by a suitable motor for moving the saw blade so as to cut a workpiece.

Typically, the band wheels are mounted in a common plane and rotate about parallel axes. Further, one of the band wheels is preferably movable relative to the other for increasing the distance between the two wheels and hence, for tensioning the continuous loop saw blade entrained thereabout.

The band wheel that is not connected to the drive motor is connected to a shaft carried on the frame and mounted for movement relative to the frame. The movement is effected through a handle-operated rod which is directly or indirectly threadingly engaged with the frame at one end and which is secured at the other end to a block or plate to which the movable band wheel shaft is mounted. The block or plate, in turn, is mounted in guides for sliding relative movement with respect to the frame. Thus, rotation of the handle in one direction will move the plate-mounted band wheel further from the fixed, motor-driven band wheel and increase the tension in the band saw blade, whereas rotation of the handle in the opposite direction will move the plate-mounted band wheel closer to the fixed, motor driven band wheel and reduce the tension in the band saw blade.

Operation of a band saw to cut through a workpiece typically produces small particles or chips which, over a period of time, may settle on various parts of the band saw. In addition, band saws are typically located in manufacturing facilities in which dirt, dust, liquid and particulate scrap material are formed, or at least present. These materials can settle on exposed surfaces, including the sliding surfaces of the block or plate carrying the movable band wheel and the guides associated therewith. With band saws having a movable band wheel for adjusting the tension of the band saw blade, the capability for moving the band wheel is sometimes affected by the amount of dirt and other material that has accumulated on the movable band wheel support structure. This accumulation of material increases the frictional resistance that must be overcome in moving the band wheel to tension the saw blade. Additionally, as a band saw blade is tightened, the band saw frame also becomes somewhat deformed with an attendant increase in friction between the sliding surfaces. The amount of frictional resistance encountered in tightening the band saw blade thus depends upon the amount and kind of material accumulated on the sliding surfaces as well as upon the degree of frame deformation in any given instance.

In the past, tightening of a band saw blade, by moving one of the band wheels relative to the other band wheel with a threaded adjustment mechanism as described above, could also cause an overtightening of the saw blade and a warping of the band saw frame.

Thus, it would be desirable to provide a mechanism that would prevent overtightening of a band saw blade while accommodating the variable frictional resistance to band wheel movement that results from accumulation of dirt and other material on the band saw.

Further, it would be desirable to provide a mechanism by which a predetermined amount of final tension could be applied to the band saw blade—a predetermined amount of tension which would be generally repeatable each time the saw blade was tensioned.

SUMMARY OF THE INVENTION

The present invention provides an improved blade tensioning mechansim for a band saw having a frame, spaced apart band wheels rotatably mounted on the frame in a common plane of rotation for carrying an endless saw blade, and a blade drive motor operably associated with one of the band wheels. At least one non-driven or idler band wheel is mounted for movement in the plane of rotation relative to the motor driven band wheel. The blade tensioning mechanism is associated with a non-driven or idler band wheel and provides displacement of the idler band wheel towards the motor driven band wheel to release tension on the endless band saw blade as well as a predetermined displacement of the idler band wheel away from the motor driven band wheel to tension the endless band saw blade.

According to the preferred embodiment of the present invention, the movable idler band wheel is rotatably mounted on a sliding block which, in turn, is slidably mounted to the band saw frame. The sliding block is provided with an integral, apertured, flat-face cam follower. An elongated, cylindrical link has a distal end extending through the flat-face cam follower. A cam is pivotally mounted on the end of the link and functions as a detent means for positioning the sliding block and also as a camming means for displacing the sliding block when the cam is pivoted against the flat face cam follower.

The end of the link opposite the cam is threaded and is threadingly received in a threaded bore in the end of a shaft that is axially aligned with the link and carried by the saw frame. A handle is provided for rotating the shaft relative to the link about the longitudinal axis of the link thus causing axial displacement of the link relative to the shaft and frame. The displacement of the link and of the link-mounted cam relative to the frame along the longitudinal axis of the link causes movement of the block and idler wheel carried thereon so as to pretension the band saw blade.

A torque limiting means, such as a slip clutch, is provided between the handle and the shaft for accommodating rotation of the shaft by the handle only until a predetermined torque value is attained for sawblade pretensioning. When the predetermined torque value is attained, the clutch slips and further rotation of the handle causes no further rotation of the shaft so that axial movement of the link is terminated. At this point the cam, engaged with the flat-face cam follower surface of the block, can be pivoted against the cam follower surface to move the block and idler wheel a predetermined distance along the longitudinal axis of the link thereby tensioning the band saw blade to a final, operational tension.

Numerous other advantages and features of the present invention will become readily apparent from the following detailed description of the invention, from the claims and from the accompanying drawings.

BRIEF DESCRIPTION OF THE DRAWINGS

In the accompanying drawings forming part of the specification and in which like numerals are employed to designate like parts throughout the same, FIG. 1 is a fragmentary, perspective view of a band saw embodying the present invention;

FIG. 2 is an enlarged, fragmentary plan view of the band saw showing the end of the band saw containing the movable band wheel and saw blade tensioning mechanism in the pretension position;

FIG. 3 is a fragmentary view similar to FIG. 2 but showing the saw blade tensioning mechanism in a position for final, operational tension; and FIG. 4 is a cross-sectional view taken generally along the plane 4—4 in FIG. 3.

DESCRIPTION OF THE PREFERRED EMBODIMENT

While this invention is susceptible of embodiment in many different forms, specific embodiments will be herein described in detail. It is to be understood, however, that the present disclosure is to be considered as an exemplification of the principles of the invention and is not intended to limit the invention to the embodiments described. The precise shapes and sizes of the components herein described are not essential to the invention unless otherwise indicated.

The band saw with which the tensioning mechanism of the present invention is associated may have certain conventional drive mechanisms and control mechanisms the details of which, though not fully illustrated or described, will be apparent to those having skill in the art and an understanding of the necessary functions of such mechanisms.

For ease of description, the apparatus of this invention will be described in a normal operating position and terms such as upper, lower, horizontal, etc. will be used with reference to this normal operating position. It will be understood, however, that the apparatus of this invention may be manufactured, stored, transported and sold in an orientation other than the normal operating position described.

The particular materials of construction for the various mechanical elements of the present invention is dependent upon the particular application involved and other variables, as those skilled in the art will appreciate.

Referring now to FIG. 1, the head of a band saw 10 is illustrated as being supported from a member 14, pivotally mounted to a column carried on a conventional stationary or movable base (not illustrated).

The saw 10 has a frame 28, and a continuous loop band saw blade 27 is rotatably supported on the frame 28 in the conventional manner around spaced apart pulleys or band wheels 32 and 34 which are carried by frame 28. The band wheels 32 and 34 are mounted in a common plane and are adapted to be rotated about parallel axes which are perpendicular to that common plane. One of the band wheels 34 is driven by means of a motor 36 also mounted on frame 28.

In the embodiment illustrated, only two band wheels are provided. It is to be realized, however, that additional band wheels, such as additional idler wheels, could also be provided.

The motor driven band wheel 34 is fixed relative to the frame 28 but the band wheel 32 is mounted for movement in the plane of rotation and relative to the motor driven band wheel 34 for tensioning the endless saw blade 27. To this end, movable band wheel 32 is mounted for rotation about shaft 40 which is carried in block 50, which in turn, is slidably disposed on frame 28 (FIGS. 2 and 4).

Block 50 comprises a number of separate pieces including a front member 54, a rear member 56, and an end member 58. Front and rear members 54 and 56, respectively, are suitably secured together, as at member 58, by means of screws 62 to define a pair of substantially parallel, aligned channels along the lateral sides of the block 50 for receiving guide tracks 70 which are secured to the frame 28 by means of screws 72. The guide tracks 70 thus function as a guide means for guiding the movement of the block 50 (and band wheel 32) in the plane parallel to the plane of rotation of the band wheels 32 and 34. The guide tracks 70 also serve to restrain the block 50 and wheel 32 against movement in the two mutually perpendicular directions normal to the direction of movement of the band wheel 32 towards and away from fixed band wheel 34.

A cam follower 80 is mounted to the block 50 by means of screws 82 and includes a generally flat face cam follower or engagement surface 86 thereon. Wear buttons or plates (not illustrated) may be provided on surface 86 is desired.

The cam follower 80 is hollow or apertured to permit the passage therethrough of an elongated link 90. The distal end of link 90 extends through the cam follower 80 and is connected to an end member 94 retained on the distal end of link 90.

A cam 100 is rotatably or pivotally mounted to a shaft 102 carried on the end of member 94. Cam 100 comprises two spaced apart and parallel cam lobes 108 defining camming surfaces 110 for engaging the cam follower surface 86. An extension rod 104 having handle 106 is secured to cam 100 for pivoting cam 100 about the shaft 102.

As best illustrated in FIG. 2, the end of the link 90 opposite from cam 100 is threadingly engaged in a bore 112 of a link receiving means or stepped diameter shaft 120 which passes through a bracket or bearing block 130 mounted to frame 28 with screws 132. The shaft 120 is connected to an operating handle 140 through a slip clutch 142 outwardly of the bracket 130. The shaft 120 can be rotated about its longitudinal axis by handle 140 when the clutch 142 is engaged and adjusts the distance D (FIG. 2) between the face 84 of bracket 130 and the face 86 of cam follower 80. Depending on the direction of rotation of the handle 140, rotation of the clutch-engaged shaft 120 causes the link 90, threadingly connected to shaft 120, to move along its longitudinal axis within the rotating shaft 120 toward or away from the handle 140, thus carrying the cam 100 toward or away from the handle 140 and changing the distance D. The slip clutch 142 functions as a torque limiting means and prevents the rotation of handle 140 from being transmitted to the link 90 after a predetermined torque value is attained. The slip clutch 142 may be of any suitable conventional design, the details of which are not critical for the present invention.

In operation, the cam 100 is oriented as illustrated in FIG. 1 with the camming surfaces 110 engaged with the cam follower surface 86 of the cam follower 80 so that the distance between the axis of the cam mounting shaft 102 and the cam follower surface 86 is a minimum. The band saw blade 27 is then tightened to an initial predetermined tension level by operating handle 140 to rotate the shaft 120 about its longitudinal axis so that link 90 moves relative to frame 28. Specifically, the rotation of handle 140 in one direction will cause the clutch 142 to rotate the shaft 120 and will cause the connected link 90 to move outwardly toward handle 140. This action will move shaft 102, carried by member 94 on link 90, outwardly toward handle 140. Cam 100, being carried outwardly by shaft 102, acts against the abutting cam follower 80 to slide block 50 outwardly whereby the band wheel 32 moves away from band wheel 34 and thus applies a tension to the saw blade 27. When a predetermined tension level is attained, the clutch 142 slips so that further rotation of handle 140 can cause no further rotation and hence, movement of, the link 90. This limits the amount of torque that can be applied to the saw blade and limits the amount of force to which the frame 28 is subjected. This prevents any warping of the frame.

After the initial tension has been set, the saw blade can be tensioned a further predetermined amount by means of the cam 100. Specifically, as illustrated in FIGS. 3 and 4, the cam 100 is rotated or pivoted about shaft 102 to orient the camming surface 110 so that the distance between the longitudinal axis of shaft 102 and the cam follower surfaces 86 is increased. This necessarily urges the cam follower 80, and the block 50 secured thereto, a predetermined distance further outwardly toward handle 140. This applies a final tension to the band saw blade 27. By appropriate design of the camming surfaces 110, the amount of final tension applied in this manner can be limited so that the force to which the frame 28 is subjected is still less than the force that would cause a warping of the frame.

Although the preferred embodiment illustrated in the figures shows the link 90 passing through the cam follower 80 and carrying the cam 100 for engagement with the cam follower 80, it is to be realized that this illustrated structure is only one form in which the present invention may be embodied. For example, the link 90 need not pass through the cam follower 80. The link 90 could be oriented exterior of the cam follower 80.

Further, the saw could be modified to eliminate the need for having a cam 100 continuously engaged with the end of the link 90. Instead, the initial tension could be applied through handle 140 by means of a separate detent means or lug mounted elsewhere on link 90 and adapted to engage the block 50 and urge it outwardly. The final tension could be applied by an additional means carried on the link 90 for engaging the block 50 and for being operated in a suitable manner to increase the spacing between the band wheels a predetermined amount to thereby further tension the band saw blade to the operational tension.

In the embodiment illustrated, the single cam 100 functions both (1) as the initial detent means for moving the block 50 to apply the initial tension when the handle 140 is rotated and (2) as the additional means (e.g., cam means) for subsequently applying the final, operational tension.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a band saw having a frame, spaced-apart band wheels rotatably mounted to said frame in a common plane of rotation and adapted to receive and carry an endless band saw blade thereon, a blade drive means operably associated with one of said band wheels to drive that band wheel, and another of said band wheels being an idler wheel and additionally being mounted for movement in said plane of rotation relative to said driven band wheel to tension said endless band saw blade, an improved blade tensioning mechanism which comprises:

a block slidably mounted to said frame and carrying said idler band wheel rotatably mounted thereon;
an apertured cam follower integral with said block;
a threaded, elongated link having a distal end extending through said apertured cam follower;
detent means mounted on said link for engaging said block;
link receiving means carried by said frame and threadingly engaged with said link, said link receiving means being braced against displacement relative to said frame, but rotatably mounted relative to said frame and link;
a handle for rotating said link receiving means thereby effecting displacement of said threadingly engaged link and of said detent means relative to said frame along the lingitudinal axis of the link to move said block and pretension said band saw blade;
torque limiting means operably disposed between said handle and said link receiving means for accommodating rotation of said link receiving means by said handle only until a predetermined torque value is attained; and
cam means mounted on said link distal end for engaging said cam follower to displace said block a predetermined distance along the longitudinal axis of said link thereby tensioning said band saw blade to operational tension.

2. The blade tensioning mechanism in accordance with claim 1 in which said cam means includes a cam lobe defining a camming surface for engaging said cam follower and in which said detent means is said camming surface.

3. The blade tensioning mechanism in accordance with claim 1 in which said frame includes a bearing bracket and in which said link receiving means is a shaft carried in said bearing bracket for rotation relative to said bearing bracket and restrained against axial movement in said bracket, said shaft defining a threaded bore with which said link is threadingly engaged, said torque limiting means being mounted to said shaft and said handle being connected with said torque limiting means.

4. The improvement in accordance with claim 1 in which said frame includes a guide means for guiding the movement of said block in a plane parallel to the plane of rotation of said band wheels and for restraining said block against movement in directions normal to the direction of movement of said idler band wheel.

5. The improvement in accordance with claim 4 in which said guide means comprises a pair of spaced apart, parallel guide tracks and in which said block defines a pair of parallel aligned channels along its lateral sides for receiving said guide tracks in sliding engagement.

6. The improvement in accordance with claim 1 in which said cam follower has a flat face engaged with said cam means.

7. In a band saw having a frame, a pair of spaced-apart band wheels rotatably mounted to said frame in a common plane of rotation and adapted to receive and carry an endless band saw blade thereon, blade drive means operably associated with one of said pair of band wheels, and the other of said pair of band wheels additionally being mounted for movement in said plane of rotation relative to said one band wheel to tension said endless band saw blade, an improved blade tensioning mechanism which comprises:
  a block slidably mounted to said frame and carrying said other band wheel rotatably mounted thereon, said block including an engagement surface;
  a threaded, elongated, cylindrical link having a distal end extending along said block;
  detent means mounted on said link for engaging said engagement surface;
  link receiving means carried by said frame and threadingly engaged with said link, said link receiving means restrained against displacement relative to said frame but permitted to rotate relative to said frame and link;
  a handle for rotating said link receiving means thereby effecting displacement of said threadingly engaged link and of said detent means relative to said frame along the longitudianal axis of said link to move said block and pretension said band saw blade;
  torque limiting means operably disposed between said handle and said link receiving means for accommodating rotation of said link receiving means by said handle only until a predetermined torque value is attained; and
  additional means carried on said link for engaging said engagement surface and for being operated to increase the spacing between said band wheels a predetermined amount thereby further tensioning said band saw blade to operational tension.

8. The improvement in accordance with claim 7 in which said additional means includes a pivotally mounted cam.

9. The improvement in accordance with claim 8 in which said cam includes a camming surface with a portion of the camming surface adapted to contact said engagement surface during the pretensioning of said band saw blade and in which said detent means includes said portion of said camming surface.

10. The improvement in accordance with claim 7 wherein said engagement surface is defined by a cam follower integral with said block.

* * * * *